INVENTOR
THOMAS D. BERTINI
BY
Chittick, Pfund, Birch, Samuels & Gauthier
ATTORNEYS

PROCESS FOR PRODUCING AN IMAGE BEARING SCREEN TRANSPARENCY

Filed June 17, 1971 2 Sheets-Sheet 2

INVENTOR
THOMAS D. BERTINI
BY
Chittick, Pfund, Birch, Samuels & Gauthier
ATTORNEYS United States Patent Office 3,794,492

Patented Feb. 26, 1974

3,794,492

PROCESS FOR PRODUCING AN IMAGE BEARING SCREEN TRANSPARENCY

Thomas D. Bertini, Tewksbury, Mass., assignor to Tober, Inc., Malden, Mass.

Filed June 17, 1971, Ser. No. 154,018
Int. Cl. G03c *5/04*
U.S. Cl. 96—41 12 Claims

ABSTRACT OF THE DISCLOSURE

A process for producing an image bearing transparency which includes exposing one side of a light sensitive film through a master photo negative of a printed circuit and exposing the opposite side of the film through an opaque drilled mask. During exposure, the master photo negative, film and drilled mask are held together with the pad holes shown on the master photo negative aligned axially with the holes in the drilled mask. Thereafter, the film is developed to produce an image bearing screen transparency.

DESCRIPTION OF THE INVENTION

This invention relates generally to the production of printed circuit boards, and is particularly concerned with a novel and improved method of producing an image bearing transparency.

Conventional methods of producing transparencies normally include the steps of (a) preparing an art work master of the printed circuit showing paths leading to pads having holes therein; (b) preparing a master photo negative from the art work master; (c) employing the master photo negative to produce a positive image; (d) manually painting or otherwise blocking out the pad holes shown on the positive image; (e) and thereafter producing either positive or negative transparencies from the manually painted positive image. The same or a duplicate of the master photo negative is normally also employed to produce a drilling template.

Material costs are increased significantly by the production of a positive image from the master photo negative. Moreover, considerable time and effort is expended in hand painting or blocking out the pad holes on the positive image. It is estimated that by eliminating the abovementioned steps (c) and (d), savings of approximately 75% in labor costs and between 50% and 60% in material costs (primarily film and processing chemicals) can be realized.

It is, accordingly, a general object of the present invention to provide an improved and unique process for producing an image bearing transparency. Another object of the present invention is to provide an improved means for producing an image bearing transparency which makes possible substantial savings in both labor and material costs. A more specific object of the invention is to produce an image bearing transparency by a process which obviates the step of manually painting or blocking out pad holes an a positive image. A further object of the present invention is the provision of a process which makes possible considerable savings in film and processing chemicals costs. Additional objects and advantages of the present invention will be apparent from the following detailed description of the invention.

Broadly stated, the present process makes use of a master photo negative which has previously been prepared from an art work master. A drilled opaque mask is then prepared from the master photo negative, either by a photo printing process or by a digitized locator. An unexposed film sheet is then positioned between the master photo negative and the drilled opaque mask, with the pad holes shown on the master photo negative aligned axially with the drilled holes in the mask, and with the combination of the master photo negative, film sheet and mask held together in a fixed relationship. Under certain conditions, it may be desirable to separate the drilled mask from the film sheet, as by positioning a transparent carrier sheet therebetween. The opposite sides of the film sheet are then exposed through the master photo negative and the drilled mask. Thereafter, the film sheet is developed to produce an image bearing screen transparency which can be either of a negative or a positive form with respect to the master art work (excluding pad holes), depending on the reproduction process being utilized.

The invention is further described with reference to the accompanying drawings wherein.

Figure 1:
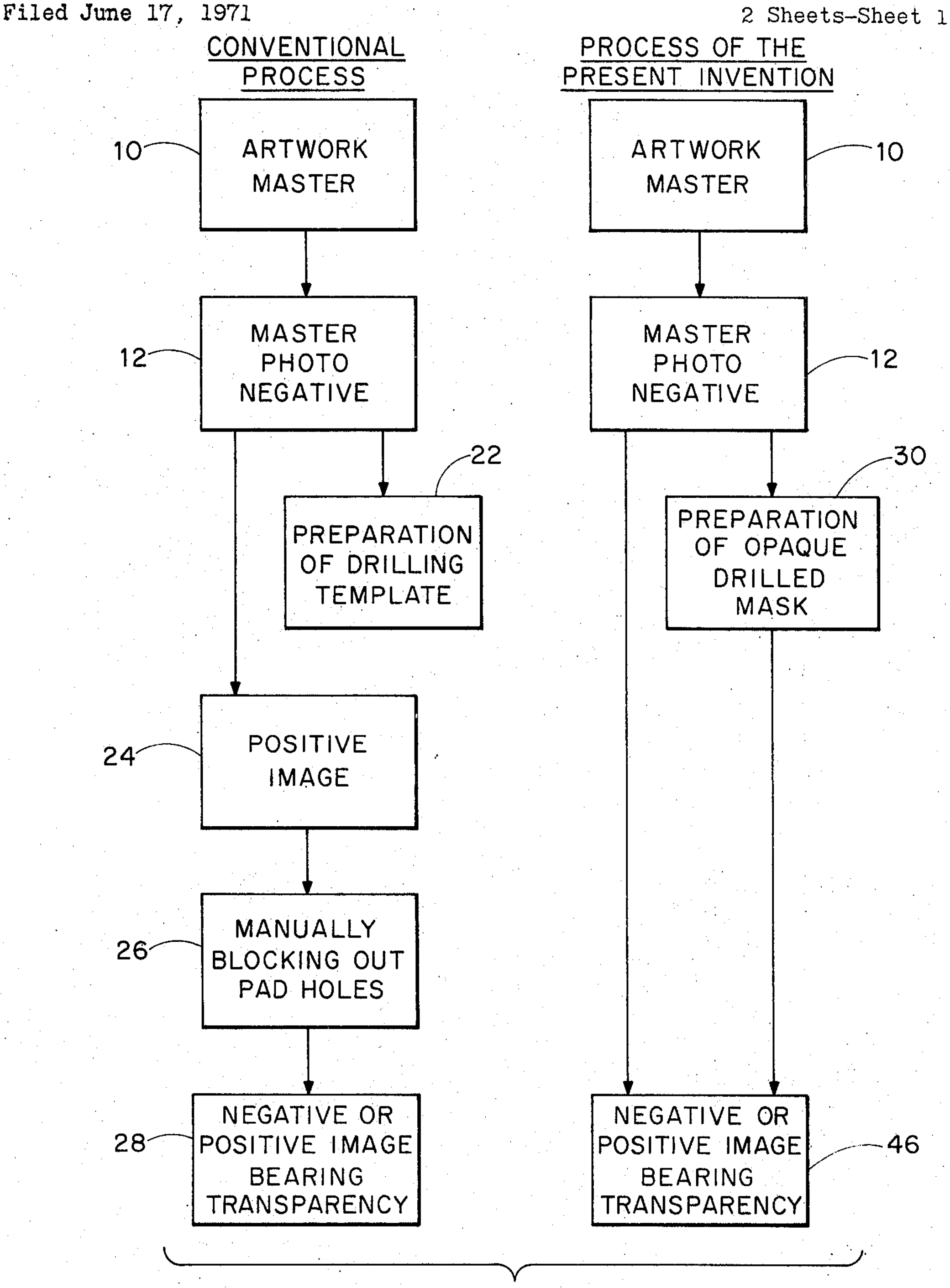
FIG. 1 is a block diagram showing both a typical conventional process and the present inventive process.
Figure 2:
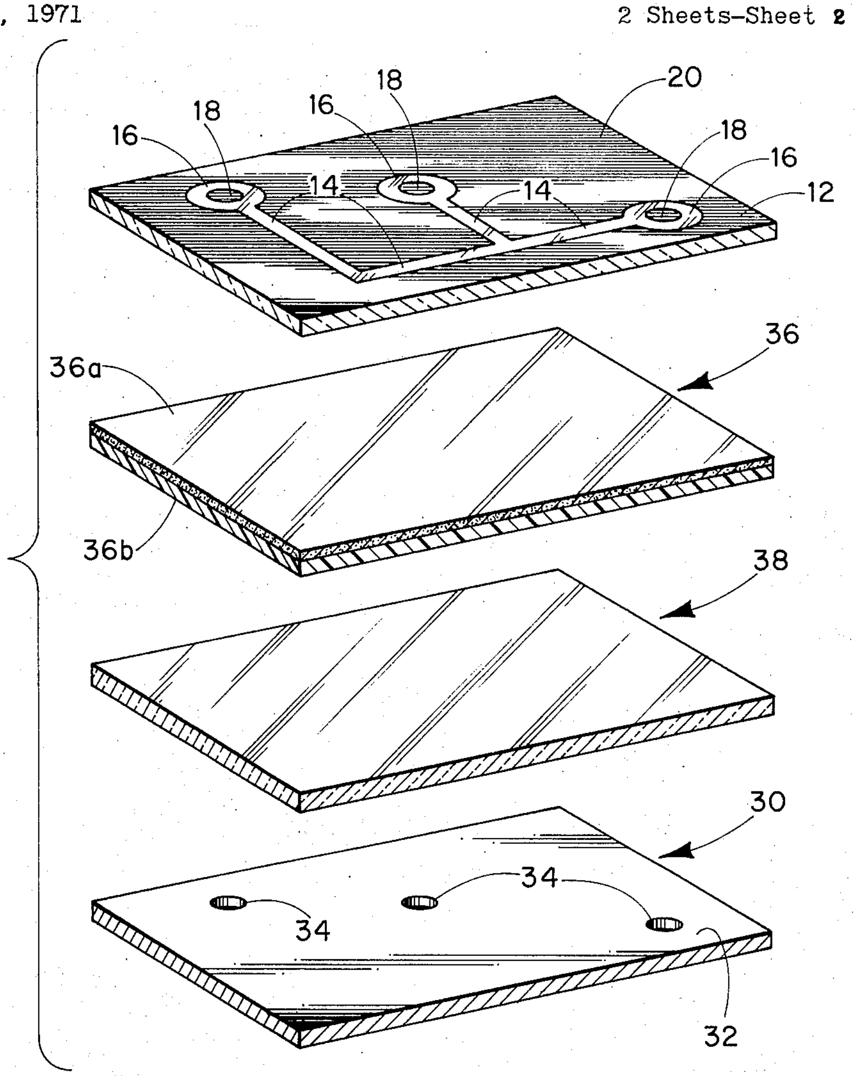
FIG. 2 is a perspective exploded view of the components employed in the present process; and, FIG. 3 is a diagrammatic illustration depicting the exposure step of the present invention.
Figure 3:
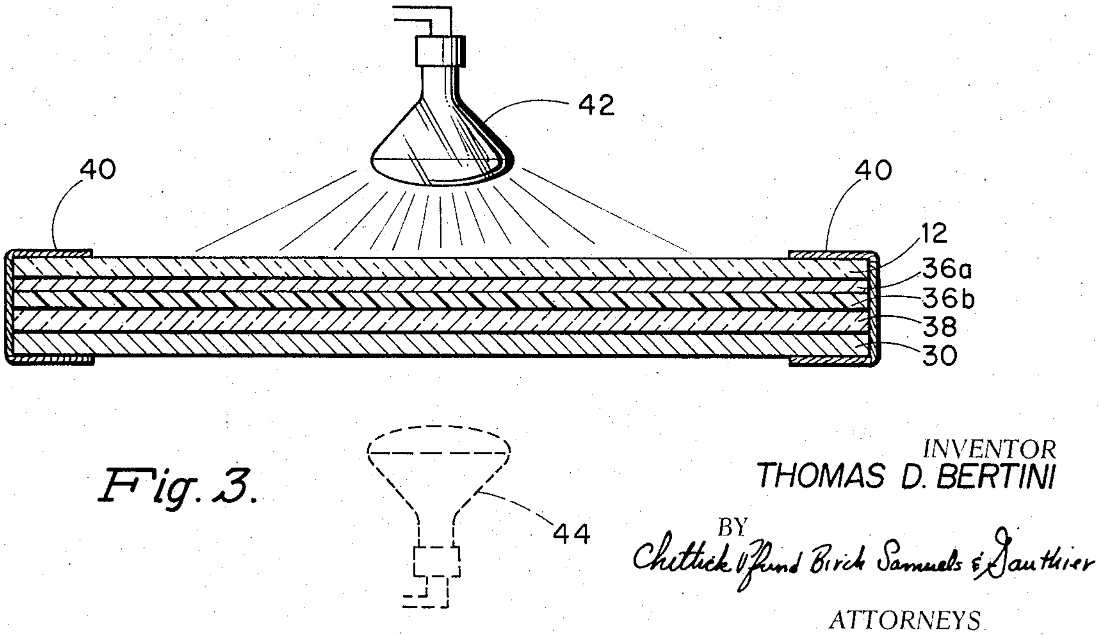

Referring initially to FIG. 1, a conventional process is shown in block diagrammatic form including the first step of preparing an art work master 10 of a printed circuit. The art work master is prepared in a conventional manner by skilled draftsmen with the circuitry being shown on an enlarged scale. A master photo negative 12 is then prepared from the art work master 10. As is best shown in FIG. 2, the master photo negative 12 depicts the printed circuit in a negative form, with the circuit paths 14 and pads 16 being transparent and the pad holes 18 and remaining background 20 opaque.

After the master photo negative 12 has been prepared the next step in the conventional process entails preparation of a drilling template which is comprised basically of sheet materials, for example, fibre glass, having holes drilled therethrough. The drilled holes are registrable with the pad holes 18 depicted on the master photo negative 12.

The conventional process further includes the preparation of a positive image 24 from the master photo negative 12. The positive image will of course be the reverse of the master photo negative, with the circuit paths 14 and pads 16 being opaque and with the pad holes 18 and background 20 being transparent. The next step in the conventional process, which is depicted in FIG. 1 at 26, involves manually blocking out the pad holes on the positive image, usually by spot painting. Experience has indicated that this is an extremely time consuming step, normally making up about 75% of the total time spent producing image bearing transparencies by the conventional process. For example, on a positive image showing 2500 pad holes, the time required for opaquing out the holes would run approximately three to four hours. After blocking or opaquing out the pad holes on the positive image 24, the conventional process is concluded by producing either a negative or a positive image bearing transparency 28. The selection of either the positive or negative form will of course depend on the reproduction process being utilized to produce the printed circuit boards. For example, when photoprinting is in use, a positive form is required, whereas where a silkscreen method is employed, the negative form will suffice.

As compared with the conventional process, it will be seen that the process of the present invention also includes the initial steps of producing an art work master 10 and a master photo negative 12. The master photo negative is then employed, in conjunction with either a photo printing process or the use of a digitized locator, to produce an opaque drilled mask as shown in FIG. 2 at 30. The mask 30 has an opaque background 32 with holes 34 drilled therethrough. The holes are registrable with the hole centers 18 shown on the master photo negative 12. The process of the present invention does not require the production of a positive image 24 followed by the step of manually blocking out pad holes. Instead, the master photo negative 12 and opaque drilled mask 30 are employed with a film sheet 46 in a single step to produce either a negative or a positive image bearing transparency. Film sheet 36 has an emulsion side 36*a* and a non-emulsion side 36*b*. The film sheet 36 is positioned between the master photo negative 12 and the drilled mask 30, with the pad holes 18 shown on the master photo negative 12 axially aligned and in registration with the drilled holes 34 in the drilled mask 30. Although not strictly required, it may be desirable in some instances to position a transparent carrier sheet 38 between the film sheet 36 and the drilled mask 30, the primary purpose of carrier sheet 38 being to diffuse light passing through the holes 34 in mask 30. Preferably, the master photo negative 12 overlies the emulsion side 32*a* of the film sheet 32. The combination of elements 12, 36 (38 where employed) and 30 are then held together in a fixed relationship by any convenient means, such as for example adhesive tape 40. Once this has been accomplished, the film sheet 36 is exposed from opposite sides through the master photo negative 12 and the drilled mask 30. Exposure can be accomplished by employing a single light source 42 to sequentially expose one side and then the other of the film sheet. Alternatively, an additional light source 44 may be employed to expose the film sheet 36 simultaneously from both sides. Experience has indicated that exposure of the emulsion sides 36*a* of sheet 36 through the master photo negative requires only normal exposure time, while exposure of the opposite non-emulsion side 36*b* of sheet 36 through the drilled mask 30 requires additional time, usually about twice the normal exposure time. The transparent carrier 38, which as indicated above may be optionally employed, permits the diffusion of light passing through the drilled holes 34 in opaque mask 32, thereby insuring full exposure of the areas defined by the pad holes.

By employing the above-described step, it will now be appreciated by those skilled in the art that the entire pad area is exposed due to the combined use of both the master photo negative 12 and drilled opaque mask 30. This completely obviates the necessity of a hand blocking or painting operation, and thus makes possible a marked saving in both time and labor costs. This procedure also obviates the necessity of producing an interim positive image from the master photo negative, thereby also making possible savings in film and development costs.

After the exposure step, film sheet 36 is developed to produce either a negative or positive image bearing transparency 46 which is then employed in a conventional manner to produce a printed circuit board.

It is my intention to cover all changes and modifications of the method herein chosen for purposes of disclosure which do not depart from the spirit and scope of the invention as set forth in the claims appended hereto.

I claim:

1. For use in the making of printed circuit boards, a process for producing an image bearing transparency by employing a master photo negative of an art work master showing a printed circuit and an opaque drilled mask, said process comprising the steps of:

(a) positioning the master photo negative on one side of an unexposed light sensitive film sheet and positioning an opaque drilled mask on the other side of said film sheet, with the pad holes shown on the master photo negative aligned axially with the holes in the opaque drilled mask, and with the master photo negative, film sheet and drilled mask fixed relative to each other;

(b) exposing said film sheet from opposite sides through the master photo negative and the holes in the opaque drilled mask; and (c) thereafter developing said film sheet.

2. The process as claimed in claim 1 wherein said film sheet is developed to produce a negative form with respect to the art work master, excluding pad holes.

3. The process as claimed in claim 1 wherein said film sheet is developed to produce a positive form with respect to the art work master, excluding pad holes.

4. The process as claimed in claim 1 wherein said opaque drilled mask is spaced from said film sheet during the exposure step.

5. The process as claimed in claim 4 wherein the opaque drilled mask is spaced from said film sheet by positioning a transparent carrier sheet therebetween.

6. The process as claimed in claim 1 wherein said film sheet has an emulsion side and a non-emulsion side, and wherein the exposure of the film sheet through the non-emulsion side is of a longer duration than the exposure of the sheet on the emulsion side.

7. The process as claimed in claim 1 wherein the opposite sides of said film sheet are exposed simultaneously.

8. The process as claimed in claim 1 wherein the opposite sides of said film sheet are exposed simutlaneously.

9. For use in the making of printed circuit boards, a process for producing an image bearing screen transparency comprising the steps of:

(a) preparing an art work master of a printed circuit which includes circuit paths leading to pads having holes therein;

(b) preparing a master photo negative of said art work master;

(c) preparing an opaque drilled mask from said master photo negative, said drilled mask having holes therein which are registrable with the holes shown on said master photo negative;

(d) positioning an unexposed light sensitive film sheet between said master photo negative and said drilled mask, with the holes depicted on the master photo negative aligned with the holes in the drilled mask, and with the combination of said master photo negative, film sheet and drilled mask held together in a fixed relationship;

(e) exposing said photo film sheet from opposite sides through said master photo negative and said drilled mask; and (f) developing the exposed film sheet.

10. The process as claimed in claim 9 wherein the art work master is prepared on an enlarged scale and wherein the master photo negative is reduced to actual scale.

11. The process as claimed in claim 9 wherein said film sheet is provided with an emulsion side and a non-emulsion side, and wherein during exposure, the master photo negative overlies the emulsion side and the drilled mask overlies the non-emulsion side.

12. The process as claimed in claim 11 wherein the exposure time through said drilled mask is approximately twice the time of the exposure through said master photo negative.

References Cited

UNITED STATES PATENTS

| | | | |
|---|---|---|---|
| 3,607,585 | 9/1971 | Cassingham et al. | 96—36.2 |
| 3,574,933 | 4/1971 | Cassingham et al. | 96—36.2 |
| 3,607,267 | 9/1971 | Garrels | 96—36.2 |
| 3,594,168 | 7/1971 | Compare | 96—36.2 |
| 3,577,239 | 5/1971 | Lesnieski | 96—36.2 |

NORMAN G. TORCHIN, Primary Examiner

E. C. KIMLIN, Assistant Examiner

U.S. Cl. X.R.

96—44, 38.3, 27 R